US 6,592,641 B2

(12) United States Patent
Alvin et al.

(10) Patent No.: US 6,592,641 B2
(45) Date of Patent: Jul. 15, 2003

(54) INTEGRAL POROUS FILTER/FAIL-SAFE/REGENERATOR/GAS SEPARATION MEMBRANE MODULE

(75) Inventors: Mary Anne Alvin, Pittsburgh, PA (US); Thomas E. Lippert, Murrysville, PA (US); Richard A. Newby, Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/957,520

(22) Filed: Sep. 19, 2001

(65) Prior Publication Data

US 2003/0051456 A1 Mar. 20, 2003

(51) Int. Cl.$^7$ ............................................. B01D 29/17
(52) U.S. Cl. ...................... 55/341.3; 55/341.4; 55/341.5; 55/341.6; 55/341.7; 55/523; 96/4; 96/8; 96/10; 210/323.2; 210/340; 210/346; 210/486
(58) Field of Search ................................ 55/302, 341.1, 55/341.2, 341.3, 341.4, 341.5, 341.6, 341.7, 523, 382; 96/4, 108, 8, 10; 210/193, 323.2, 340, 346, 486

(56) References Cited

U.S. PATENT DOCUMENTS

| | | | | |
|---|---|---|---|---|
| 4,904,287 A | * | 2/1990 | Lippert et al. ................. 55/302 |
| 5,094,673 A | * | 3/1992 | Kilicaslan et al. ............. 55/302 |
| 5,135,665 A | * | 8/1992 | Birkenstock et al. ..... 210/323.2 |
| 5,384,034 A | * | 1/1995 | Hetzel ......................... 210/236 |
| 5,433,771 A | | 7/1995 | Bachovchin et al. |
| 5,443,806 A | * | 8/1995 | Isaksson et al. ............. 423/237 |
| 5,780,126 A | * | 7/1998 | Smith et al. ................ 928/34.5 |
| 5,876,471 A | | 3/1999 | Lippert et al. |
| 5,944,859 A | | 8/1999 | Lippert et al. |
| 6,123,746 A | | 9/2000 | Alvin et al. |
| 6,139,604 A | * | 10/2000 | Gottzmann et al. ............. 95/54 |
| 6,143,556 A | * | 11/2000 | Trachtenberg ........... 935/289.1 |
| 6,180,054 B1 | * | 1/2001 | Connolly et al. ........... 264/628 |
| 6,273,925 B1 | | 8/2001 | Alvin et al. |

OTHER PUBLICATIONS

M.A. Alvin, Metal Gas Separation Membrane, U.S. patent application Ser. No. 09/822,927, filed Mar. 30, 2001.
M.A. Alvin et al., Metal–Ceramic Composite Candle Filters, U.S. patent application Ser. No. 09/586,644, filed Jun. 5, 2000.
M.A. Alvin et al., Catalytically Enhanced Dual Membrane Filter Elements, U.S. patent application No. 09/676,181, filed Sep. 29, 2000.
M.A. Alvin et al., Multipurpose Single External Seal Filter Assembly for Metallic and Ceramic Tube Filters with Integral Locking Means, U.S. patent application Ser. No. 09/602,214, filed Jun. 23, 2000.

* cited by examiner

*Primary Examiner*—Duane Smith
*Assistant Examiner*—Minh-Chau T. Pham

(57) ABSTRACT

A combined hot gas cleanup system and gas separation unit is contained within a single pressure vessel. Preferably, the combined unit is an integral structure that is retrofittable to replace existing candle filters in their installed holders. The integral unit can be replaced to adapt the combined system for different applications.

9 Claims, 5 Drawing Sheets

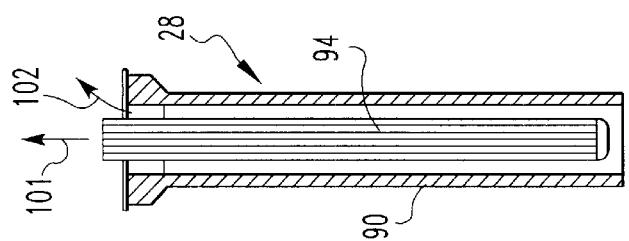
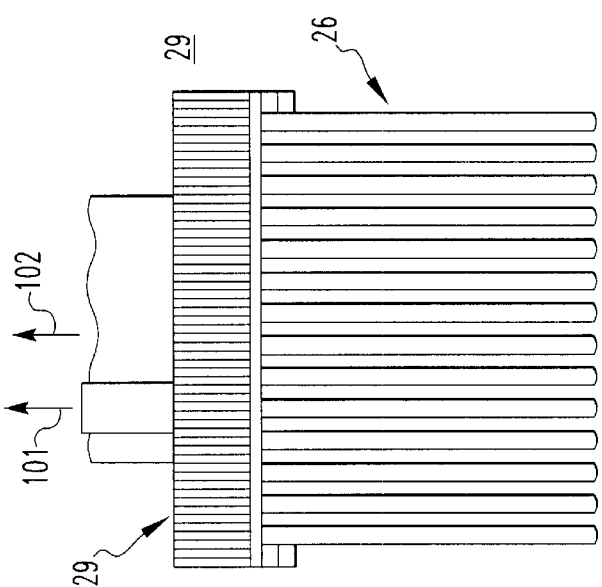
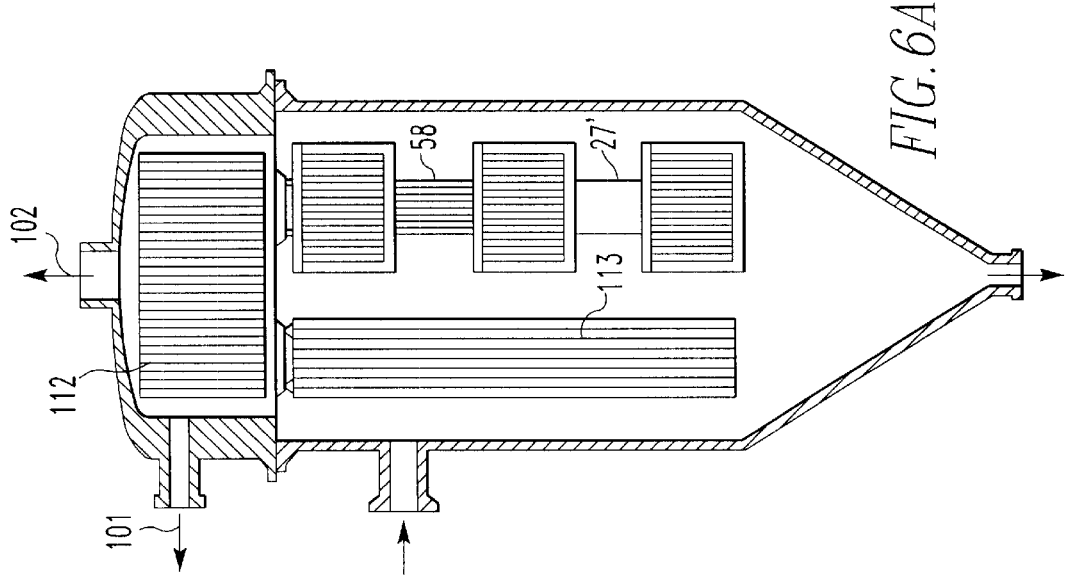
FIG. 6A
FIG. 6B
FIG. 6C

INTEGRAL POROUS FILTER/FAIL-SAFE/REGENERATOR/GAS SEPARATION MEMBRANE MODULE

FIELD OF THE INVENTION

The present invention relates generally to hot gas cleanup systems and more particularly to such systems that separate out, in addition to particulate matter, a molecular component of the gas.

BACKGROUND OF THE INVENTION

Hot gas filtration systems are key components in advanced coal or biomass-based power plants. The hot gas filtration systems protect the downstream heat exchanger and gas turbine components from particle fouling and erosion, and clean the process gas to meet emission requirements. When hot gas filtration systems are installed in either pressurized fluid-bed combustion (PFBC), pressurized circulating fluidized-bed combustion (PCFBC), or integrated gasification combined cycle (IGCC) plants, lower downstream component costs are projected, in addition to improved efficiency, lower maintenance, and elimination of additional and expensive fuel and/or flue gas treatment systems. As a critical component, long term performance, durability and life of the porous ceramic and/or metal filter elements and associated high temperature, primary and secondary gasket seals are essential to the successful operation of hot gas filtration systems in advanced combustion and gasification applications. Utilization of this advanced barrier filter system concept extends as well to industrial applications where enhanced purity of product, separation of materials, and emissions control can be realized.

Examples of prior art hot gas filtration systems can be found in U.S. Pat. Nos. 5,433,771 and 5,876,471 assigned to the assignee of this application. The prior art teaches, as illustrated in FIG. 1, the use of a filter apparatus 20 for separating particulate matter from a gas stream. This apparatus includes a pressure vessel 22 in which there are mounted a plurality of clusters comprising a plurality of filter element arrays 26. These filter element arrays 26 include a plurality of "candle filter elements" 28.

The pressure vessel 22 has a dome shaped head 30 and body 32. The dome shaped head 30 terminates in a co-linear axial tubular extension 34 that defines an exit opening or nozzle 36 for the filtered gas to be removed from the vessel 22. The body 32 of the pressure vessel 22 includes an unfiltered gas inlet 25, an upper portion 38 that interfaces with the domed head 30, having a generally circular cylindrical shape, that is joined by a frusto-conical ash hopper 40 at the end opposite the domed head 30. The ash hopper 40, which is designed to receive the particulate matter, terminates at its opposite end in a linear coaxial extension that defines an opening or nozzle 42 that is connectable to an ash discharge line. A plurality of ports 44 extend from the dome shaped head 30. The ports 44 provide a site for inserting instrumentation and for viewing the interior of the domed shape head 30 during shutdown periods. Through each port 44 tubes 46 for supplying a back pulse burst of gas for cleaning the candle filters 28 can be placed.

Referring to FIG. 2, the pressure vessel 22 includes a tube sheet 48 which separates dirty and clean sides of the system, and which supports vertical clusters 27 best shown in FIG. 1. Each cluster 27 is comprised of one or more manifolds or plenums 29 which in turn supports arrays 26 containing filter elements 28, as best viewed in FIG. 2. Each plenum 29 comprises an upper plate 50 and a lower plate 52. In accordance with the present invention, each filter element 28 is held within a filter holder and gasket assembly 60 (best shown in FIG. 3) and coupled to the corresponding lower plate 52 of the plenum 29. Each cluster support pipe 58, as shown in FIG. 2, is supported parallel to the central axis of the pressure vessel 22. A dust shed or particle deflector 56 having a generally frusto-conical shape is attached above each plenum 29.

The prior art teaches the use of the filter holder and gasket assembly 60 as shown in FIG. 3 with a conventional thick-wall hollow tube monolithic ceramic. Fixturing for an alternate porous metal candle filter 28, and/or a thin wall composite and/or filament wound candle filter 28 is taught in U.S. Pat. Nos. 5,876,471, 5,944,859, 6,123,746 and 6,273,925. The filter holder and gasket assembly 60 provide a particulate barrier seal between the clean gas and dirty gas surfaces of the filter element 28. In FIG. 3, the filter holder and gasket assembly 60 for a conventional thick wall ceramic candle filter is shown assembled. The filter holder and gasket assembly 60 comprise a filter housing 62 having a peripheral sidewall 64 which defines an interior chamber 66, a fail-safe/regenerator device 68, permanently or removeably installed within the interior chamber 66, an annular spacer ring 70 permanently or removeably installed within the interior chamber 66, a gasket sock or sleeve 72, a top or topmost compliant gasket 74, a bottom or bottommost compliant gasket 76 and a cast nut 78.

Preferably, the spacer ring 70 is permanently mounted to the fail-safe/regenerator to produce a single unit that is placed within the interior chamber 66 of the filter housing. In this case, the spacer ring 70 may be welded in abutment with the fail-safe/regenerator 68 to secure the fail-safe/regenerator 68 unit and to prevent the filter element 28 from moving and contacting the filter housing 62, thereby preventing possibly damage to the filter element 28. When the fail-safe/regenerator 68 is not incorporated into the filter housing 62, then only the spacer ring 70 will be securely mounted within the filter holder interior chamber 66. Alternately, the fail-safe/regenerator device 68 may be removeably mounted within the housing interior chamber 66 with the spacer ring 70 permanently mounted within the housing interior chamber 66. The fail-safe/regenerator device 68 is provided to prevent matter from travelling from the dirty gas stream to the clean gas area of the pressure vessel 22 if a candle filter element fails, is damaged or breaks. Additionally, the fail-safe/regenerator 68 will heat the back pulsed gas, which is generally cooler than the gas stream to prevent the filter element 28 from enduring thermal fatigue or cracking.

The fail-safe/regenerator unit 68, more fully described in U.S. Pat. No. 5,433,771, is a tubular metal unit 51 having perforated metal plates 53 welded to each end. Fine mesh screens 54, and heavy mesh support wires 55 are positioned adjacent to the metal plates 53 within the interior of the tubular member 51. The fine mesh screens 54 serve as the fail-safe mechanism to capture and retain fines, and plug in the event that a candle filter 28 fails, is damaged or breaks. The heavy mesh support wires 55 provide structure to support the fine mesh screens 54. Within the interior of the fail-safe/regenerator 68 raschig rings 73 are contained between the heavy mesh support wires 55, to heat incoming back pulsed gas that is used to clean the candle filters 28, which are part of the filter arrays 26 within the pressure vessel 20.

Applicants have found that in many hot gas filtering applications it is desirous to separate constituent components of the filtered gas such as in syngas applications. This can be achieved through the use of micro-porous membranes. A micro-porous membrane particularly suited to high temperature applications for separating hydrogen from a gas stream is particularly described in co-pending application Ser. No. 09/822,927 filed Mar. 30, 2001. Use of such membranes have been considered feasible in the temperature range of 600–1600° F. (315–870° C.). Hydrogen separation from syngas is a processing step having major market potential today in integrated refinery applications and for chemical synthesis. The high market potential of hydrogen production and the complementary aspects of producing a syngas concentrated in $CO_2$ for removal and isolation, make the selection and implementation of hydrogen separation membranes as part of an integrated gas conditioning module, i.e., porous filter element (with or without catalytic enhancement) combined with a gas separation member unit, attractive.

Catalysts can be employed with the high temperature gas separation membrane to enhance the efficiency of the separation process. Catalytic reactors for syngas conversions of many types are commercially available and widely utilized in industry. The types of catalysts materials and operating temperatures needed are well known for example:

Tar cracking (Ni-based at 1200–1600° F. (650–870° C.))

Ammonia cracking (Ni-based at 1300–1600° F. (705° C.–870° C.); RA-330® (available from Rolled Alloys, Temperance, Mich., USA) at 1200–1600° F. (650–870° C.); Zn-based at 900–1300° F. (480–705° C.))

COS hydrolysis (Ni-based at 900–1100° F. (480–595° C.))

Water-gas shift (Chromia-promoted iron oxide at 600–1500° F. (315–815° C.), CuO—Zn)—$Al_2O_3$, at 400–500° F. (205–260° C.).

Co-pending patent application Ser. No. 09/676,181, filed Sep. 29, 2000, teaches a method for catalytic enhancement of dual membrane filter elements. The foregoing patent application discusses the use of catalysts for reduction of NO, $NH_3$, oxidation of methane, steam reforming and hydrogen treatment and $SO_x$ reduction. Incorporation of the catalyst directly onto or within the porous ceramic, continuous fiber ceramic composites (CFCC), metal, intermetallic, and/or metallic/ceramic composite filter body (i.e., wash coats of perovskite, zeolites, spinels, etc.; application via sol-gel; etc.), provides the basis for generation of specific catalytically-active porous media, i.e., filter elements, for use in advanced integrated gasification combined cycle coal-fired, oil-fired, and biomass applications. Similarly, the substrate Nickel-based materials, i.e., RA333® (available from Rolled Alloys, Temperance, Mich., USA), HR-160® (available from Haynes International of Kokomo, Ind., USA) and NiAl may act as a catalytic media that will not require the incorporation of additional catalytic enhancement species.

SUMMARY OF THE INVENTION

Accordingly, it is an object of this invention to combine the attributes of a hot gas cleanup filter with those of a hot gas separation membrane.

Additionally, it is a further object of this invention to combine the attributes of a hot gas cleanup filter and a gas separation membrane in a single module.

It is a further object of this invention to combine the attributes of the hot gas filter and gas separation membrane into a single module that replaces existing candle filters.

These and other objects are achieved in accordance with this invention by a hot gas cleanup system contained within a pressure vessel having a hot gas inlet and a first and second hot gas outlet. A primary chamber is formed within the pressure vessel in gas flow communication with the hot gas inlet. A secondary chamber is formed within the pressure vessel in gas flow communication with the first hot gas outlet. A candle filter assembly separates the primary chamber from the secondary chamber and a gas separation membrane is disposed within the secondary chamber; defining a third chamber in gas flow communication with the second hot gas outlet.

Preferably, the candle filter assembly includes a downstream regenerator and the gas separation membrane is disposed between the candle filter and the regenerator. In one embodiment, the candle filter is constructed from a porous metallic or intermetallic material and preferably the candle filter, gas separation membrane and regenerator are formed as an integral filtration unit. Desirably, the integral filtration unit is formed to fit in an existing candle filter housing to replace an existing candle filter.

In one advantageous embodiment, the gas separation membrane is formed as a tube having a first closed end and a second opened end that is affixed to and in gas communication with a gas conduit, which together with the interior of the gas separation membrane, comprises the third chamber. Preferably, the gas conduit extends through the regenerator.

BRIEF DESCRIPTION OF THE DRAWINGS

A further understanding of the invention can be gained from the following description of the preferred embodiments when read in conjunction with the accompanying drawings in which:

FIG. 6a is a schematic view of a pressure vessel illustrating alternative embodiments for the candle filters/gas separation membranes of this invention;

FIG. 6b is a schematic view of an alternative to one of the embodiments shown in FIG. 6a; and FIG. 6c is a schematic of another alternative to the embodiments shown in FIG. 6a, which is similar to the embodiment shown in FIG. 5 without the fail-safe regenerator.

DESCRIPTION OF THE PREFERRED EMBODIMENT

Figure 1:
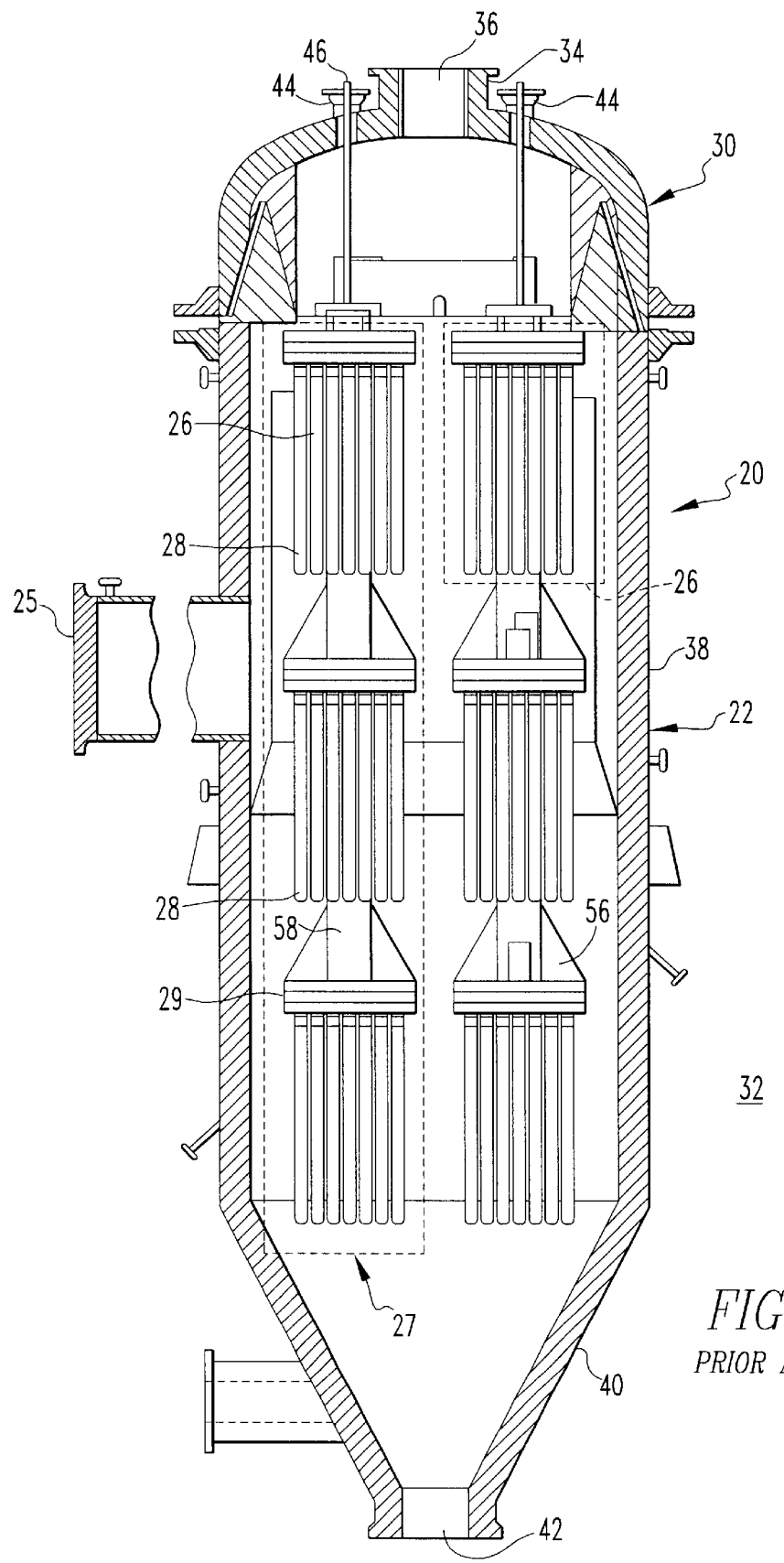
FIG. 1 is a longitudinal sectional view of a pressure vessel incorporating a filter holder candle and gasket assembly.

This invention employs the use of porous metal and/or intermetallic media tubes in either pressurized fluidized-bed combustion (PFBC), pressurized circulating fluidized-bed combustion (PCFBC) or integrated gasification combined cycle (IGCC), biomass, and industrial applications. In order to facilitate greater than 99.999% particle collection efficiency, and long term performance and use, the porous metal and/or intermetallic filter media (i) must achieve permeability and particle collection tolerances defined by the system manufacturers; (ii) must be composed of materials that withstand oxidation and/or corrosive attack from high temperature process gas streams containing steam, gaseous sulfur, chlorides, and/or alkali species; (iii) must be capable of being welded to dense metal parts with the weld being resistant to oxidation and/or corrosive attack from high temperature process gas streams containing steam, gaseous sulfur, chlorides, and/or alkali species; (iv) must be capable of being pulse cleaned, removing ash from the filtration surface and returning to a lower pressure drop; (v) must be formed in such a manner as to be captured and sealed within the filtration system. In the preferred embodiment, the porous metal media filter elements of this invention, including gas separation membranes, are retrofittable; being capable of being captured and sealed within existing filtration systems.

This invention employs conventional metal, intermetallic or superalloy, fiber, or powder-containing filter elements, with or without catalytic enhancement of the porous filter media. Depending on the process application needs, specific catalysts can be selected and applied to the pore cavity surfaces of the metal, intermetallic, or superalloy filter media. As taught in co-pending application Ser. No. 09/586,644, filed Jun. 5, 2000, the porous catalytically enhanced layer may consist of precious metals, nonprecious metals, perovskites, zeolites, spinels and the like. Multi-catalytic functionality of the filter media can be achieved by selective deposition of catalysts throughout various locations through the filter wall, i.e., outer particulate membrane surface; porous filter wall; and inner membrane surface.

The invention utilizes a densified metal housing or shell to form a flange-like structure, as taught in U.S. Pat. No. 6,273,925, issued Aug. 14, 2001, with integral fail-safe regenerator characteristics for (i) assurance of prevention of the passage of particulate fines into the clean process stream in the event of filter failure and (ii) heating of the pulse cleaning gas to mitigate thermal shock throughout the porous filter body. The integral flange/fail-safe/regenerator concept provides a simplistic assembly not only for (i) retrofit installation within metal filter housings; (ii) assurance of mitigating particulate leak paths around the current and prior art filter flange, gaskets, and/or fail-safe/regenerator units; (iii) serving as a standard assembly for use with variably manufactured porous metal filter media configurations and/or compositions; but is also (iv) reuseable for the attachment of alternate media, e.g., different membranes and/or catalysts for the separation of different gas constituents.

The invention disclosed herein utilizes a metal fail-safe/regenerator similar to that taught by the prior art, and further includes at least one metal tube fixtured through the fail-safe/regenerator, which serves to transport the selectively enriched permeate gas stream which has been separated from the particulate-free process gas stream via an attached metal or ceramic tubular bundle or honeycomb membrane module.

In an alternate embodiment, if a porous ceramic monolithic, filament wound, or fiber reinforced composite candle filter element is employed in the combination of this invention with an internal gas separation membrane, the integral metal fail-safe/regenerator/gas separation membrane module remains as a separate unit placed above and inserted into the porous ceramic filter elements. Assembly and fixturing of the module and filter element in this embodiment into the filter housing is accomplished via gaskets and clamping techniques taught in the prior art.

Figure 4:
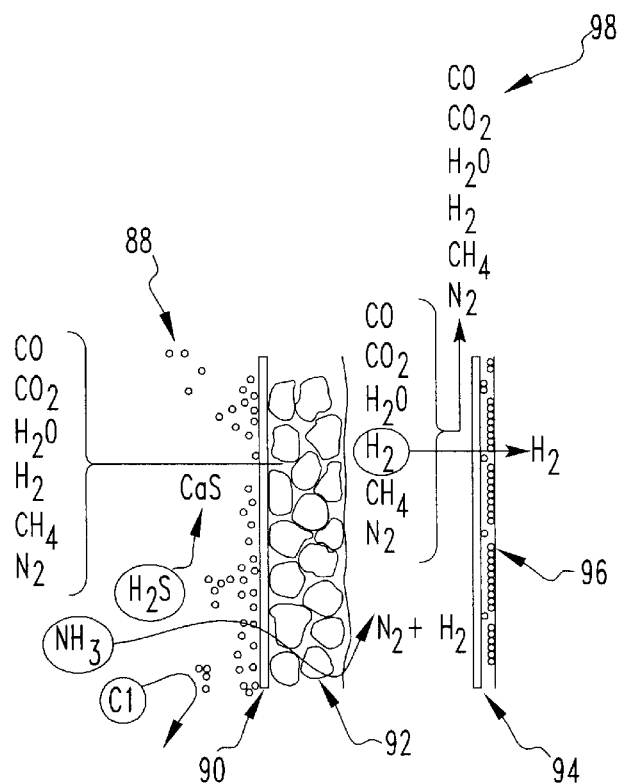
FIG. 4 is a schematic of a catalytically enhanced porous filter media showing sequential particulate removal, catalytic decomposition and gas separation.

FIG. 4 illustrates the sequential high temperature particulate removal, catalytic decomposition, and gas separation achieved by this invention. The modular concept shown in FIG. 4 focuses specifically on the catalytic decomposition of gas phase ammonia via the catalytically enhanced filter media, and subsequent separation, removal, and enrichment of gaseous hydrogen from the process gas streams. The modular concept can be applied to alternate catalytic decomposition and/or separation reactions, and is not solely limited to the selective decomposition of ammonia, and gas separation and enrichment of hydrogen. More particularly, the process gas feed stream 88 is filtered of particulate matter at the outer filter wall of the ceramic or metal filter element 90 through which it passes and flows through a catalytically enhanced filter wall 92 which enhances the catalytic reaction, e.g., for conversion of $NH_3 > N_2 + H_2$ in this case, resulting in an enrichment of hydrogen molecules which are passed through the gas separation membrane 94 comprised of a metal, ceramic or palladium layer which can contain the same catalyst as the filter media to further convert, for example, $N_2 + H_2$ or an alternate catalyst to promote water gas shift and drive through more $H_2$ to form a permeate stream of enriched hydrogen ($H_2$) 96 which then flows in parallel with a retentate stream 98 ($H_2$ depleted) that now has a reduced hydrogen concentration.

In its most general sense, the preferred embodiment of this invention utilizes a metal fail-safe/regenerator and integrates a tubular bundle or honeycomb metal or ceramic membrane configuration for selective high temperature, separation of gas phase species. The metal fail-safe/regenerator/gas separation membrane may be further integrated with metal or intermetallic filter media, forming a single, multifunction, high temperature filtration component. Alternately, the metal fail-safe/regenerator/metal or ceramic gas separation membrane unit may remain as a separate unit placed above and inserted into porous ceramic monolithic, filament wound, fiber reinforced composite, oxide or nonoxide-based filter elements. The porous metal, intermetallic, or ceramic filter element may be enhanced to catalytically convert gas phase species present in advanced coal or biomass-based power systems, combustion, gasification, pyrolysis streams, or alternately for use in industrial or chemical applications. Functionally, the integral flange/fail-safe/regenerator/gas separation membrane module is retrofittably installed within existing filtration hardware.

Figure 5:
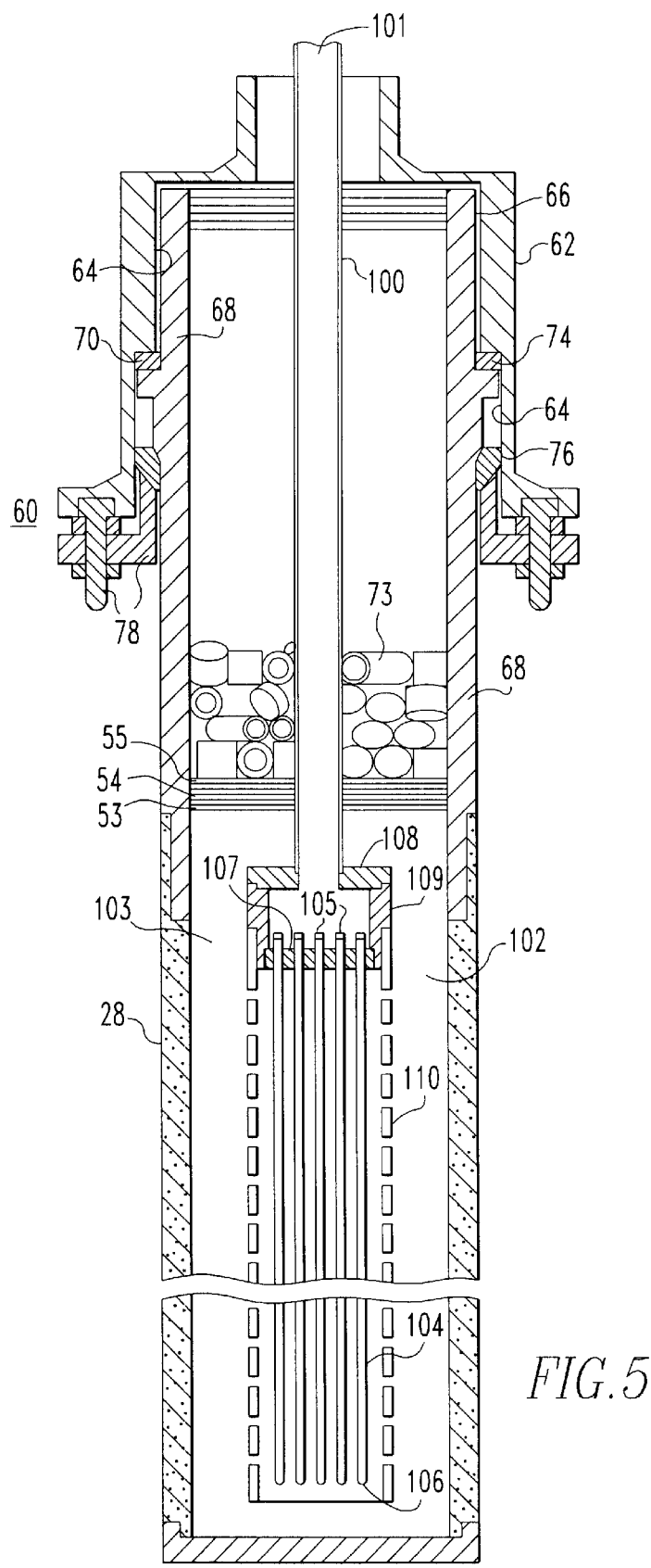
FIG. 5 is a longitudinal sectional view of an integral porous filter/gas separation membrane module in accordance with this invention.

As shown in FIG. 5, a metal tube 100 is inserted into and through outer perforated plates 53 of the metal/fail-safe/regenerator 68. In the preferred arrangement, the metal tube 100 is permanently fixtured, such as by welding, to the outer perforated plates 53. Within the interior of the dense metal flange/fail-safe/regenerator 68, raschig rings 73 are contained between the heavy mesh support wires 55, to heat incoming back pulsed gas that is used to clean the candle filters 28, and/or filter arrays 26, within the pressure vessel 20 shown in FIG. 1. The metal tube 100 serves to transport the selectively enriched permeate gas stream 101 which has been separated from the particulate free process gas stream 102 via an attached metal or ceramic tubular bundle or honeycomb membrane section 103.

The metal tubular bundle 103, shown in FIG. 5, consists of small diameter porous membrane tubes 104, each containing an open end 105 and a closed end 106. The open end 105 of each tube is inserted and affixed by welding or other means into a perforated plate 107 which forms the tube sheet for supporting the membrane tubes 104. The tube sheet 107 is in turn affixed by welding or other means to the module housing consisting of a flat plate 108 which is affixed to a dense cylindrical pipe or tubing section 109. Perforated pipe or tubing 110 is then affixed, e.g., by welding or other technique, to the dense cylindrical pipe or tubing section 109, providing structural protection for the contained small diameter, porous membrane tubes 104. The tubular bundle housed in its module 103, in turn is affixed, by welding or other means, to the metal tube 100. Particulate free process gas 102 passes through the perforated pipe or tubing 110, contacting each small diameter, metal membrane tube 104. Via diffusion, the select gas phase species passes through the microporous walls of the membrane tubes 104, and is released into the off gas permeate stream 101.

The diameter of the membrane tubes 104 may range in size from approximately 3 mm to approximately 10 mm. Each tube consists of a structural support layer containing micron diameter metal fibers or particles. The outer surface of the structural support is encased via either a gradient of metal fibers or particles ranging in diameter from microns to nanometers, or alternately, a single nanometer diameter metal or ceramic fiber or particle-containing layer is deposited along the external surface of the metal tubes 104 as described more fully in U.S. patent application Ser. No. 09/822,927, filed Mar. 30, 2001. The fiber size, orientation and layer thickness define the specific porosity of the gas separation membrane. The metal fibers and/or powders may include but are not limited to Nickel-based alloys. Precious metals, non-precious metals, and the like may be included along the surface and/or within the nano-sized gas separation membrane layer. The pressure differential applied across the gas membrane wall of the membrane tubes 104, drives diffusion of the select gas phase species through the microporous wall, and subsequent enrichment in the off-gas permeate stream 101.

Alternately, small diameter ceramic tubes and/or preferably ceramic honeycombs can be used in the gas separation module 103. These include, but are not limited to, commercially available tubular and honeycomb structures under the tradename Membralox® (offered by USF Filtration/Fluid Dynamics, Deland, Fla., USA). Said ceramics may include but are not limited to oxides such as alumina, aluminosilicates, silicates, etc. Compression sealing of the ceramic honeycomb via appropriate gasketing within the perforated or nonperforated metal cylindrical pipe or tubing 110, and subsequent welding to the modular housing 108, 109, and metal tube 100, form the ceramic gas separation membrane module. Similar to the metal membrane tubes 104, the honeycomb architecture consists of a structural support layer, and a layer of either a gradient of ceramic fibers or particles ranging in diameter from microns to nanometers, or a single nanometer diameter external surface.

The metal fail-safe/regenerator/metal or ceramic gas separation membrane unit may be further integrated with metal or intermetallic filter media, forming a single, multifunctional, high temperature filtration component. Alternately, the metal fail-safe/regenerator/metal or ceramic gas separation membrane unit may remain as a separate unit placed above and/or inserted into porous ceramic monolithic, filament wound, fiber reinforced composite, oxide or non-oxide based filter elements.

Figure 2:
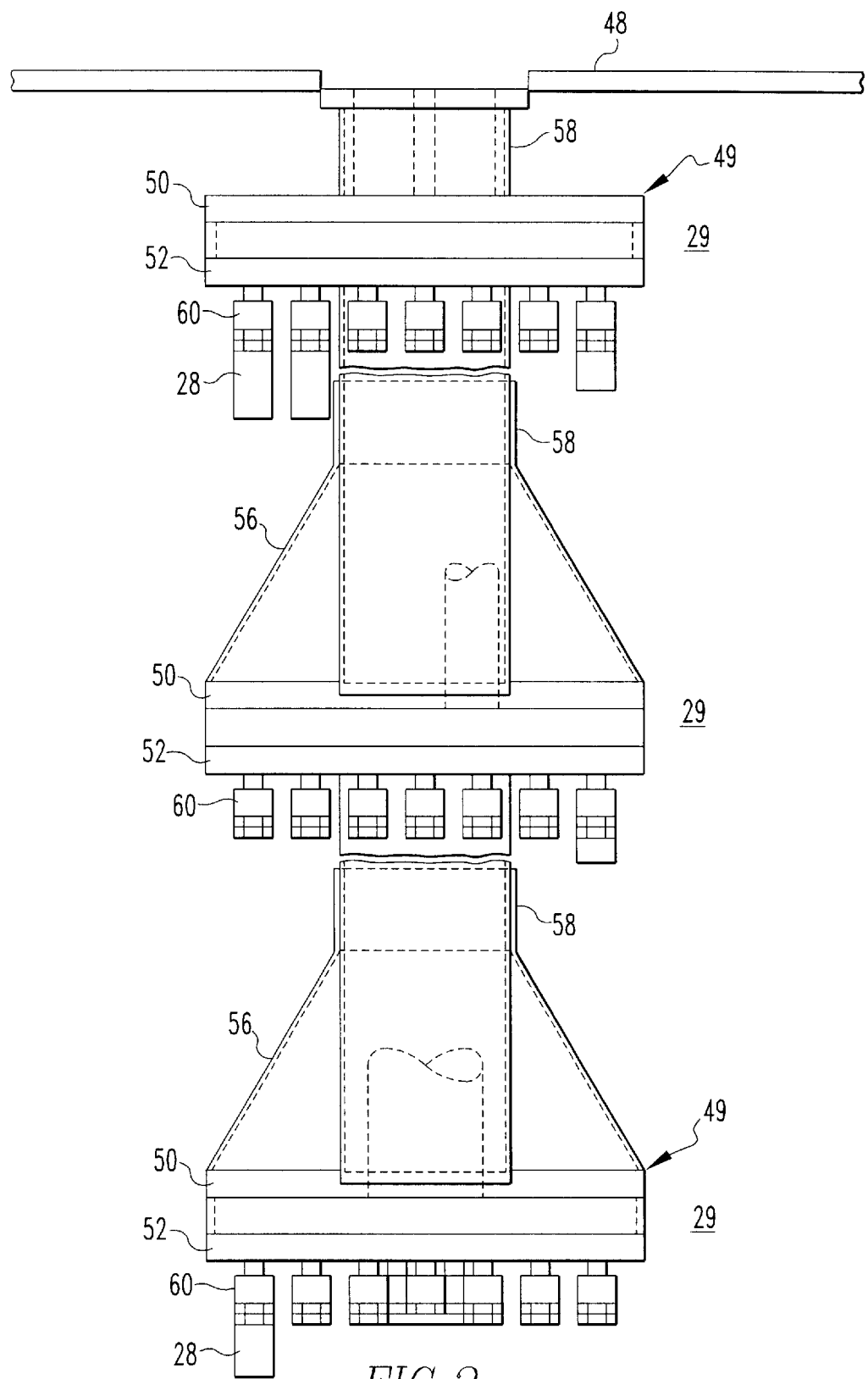
FIG. 2 is a side elevational view of an array of filter elements of FIG. 1 coupled to a tube sheet.
Figure 3:
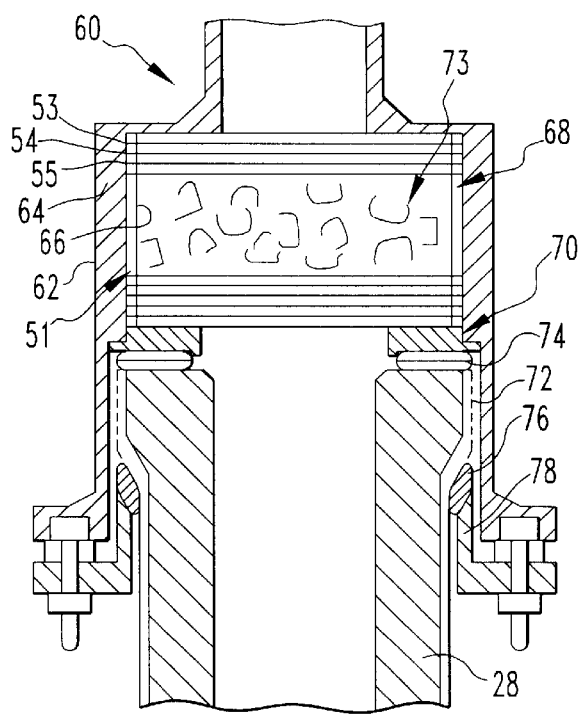
FIG. 3 is a sectional view of a filter holder and gasket assembly employed by the prior art with conventional monolithic thick-walled hollow candle filters.

Gasketing and fixturing of the multifunctional filter/fail-safe/regenerator/gas separation membrane unit within the filter housing 62 is similar to that described for the prior art. The permeate gas stream 101 is ducted through the metal tubes 100 through, for example, the cluster support pipes 58, the manifold plenums 29, the tube sheet 48 (shown in FIG. 2) and ultimately through the plurality of ports 44 (shown in FIG. 1) extending from the dome-shaped head 30 of the filter pressure vessel 20.

Alternate embodiments to the integral filter/fail-safe/regenerator/gas separation membrane module which increases the gas separation membrane surface area through the inclusion of additional gas separation membrane bundles is taught in FIGS. 6a, 6b and 6c. In addition to or instead of having the membrane clusters positioned within the candle filter members, the membrane clusters may be positioned in the flow pipes 58 or in the header 112 of the pressure vessel 20 as shown in FIG. 6a. Alternately, a separate extended membrane bundle container 113 can be provided or the cluster assembly 27' can be made up of membranes as shown in FIG. 6a in lieu of the candle filter elements shown in the cluster assemblies 27 in FIG. 1, though separate filtering would have to be included. Additionally, the membrane bundle can be inserted inside the vertical cluster manifolds 29 as shown in FIG. 6b without or with the integral membrane candle filter element shown in FIG. 6c.

Thus, the integral porous filter/fail-safe/regenerator/gas separation membrane module of this invention provides a highly compact, multifunctional component that exhibits wide versatility for achieving various catalytic decomposition reactions and/or separation reactions. This integral gas cleanup and separation system is functional in caustic environments and reduces the number of vessels required, thus achieving a significant cost and energy savings. The use of fewer vessels and piping and reduced heat loss, greatly increases the value of the integral component.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A hot gas cleanup system including:
    a pressure vessel having a hot gas inlet and a first and second hot gas outlet;
    a primary chamber within said pressure vessel in gas flow communication with said hot gas inlet;
    a secondary chamber within said pressure vessel in gas flow communication with said first hot gas outlet;
    a candle filter assembly separating the primary chamber from the secondary chamber;
    a gas separation membrane disposed within said secondary chamber and defining a third chamber in gas flow communication with said second hot gas outlet; and
    wherein the candle filter assembly includes a downstream regenerator and the gas separation membrane is disposed between the candle filter and the regenerator.

2. The hat gas cleanup system of claim 1 wherein the candle filter is constructed from a porous metallic or intermetallic material.

3. The hot gas cleanup system of claim 2 wherein the candle filter, gas separation membrane and regenerator are formed as an integral filtration unit.

4. The hot gas cleanup system of claim 2 wherein the integral filtration unit is formed to fit in an existing candle filter housing to replace an existing candle filter.

5. The hot gas cleanup system of claim 1 wherein the gas separation membrane is formed as a tube having a first closed end and a second open end that is affixed to and in gas flow communication with a gas conduit, which together with an interior of the gas separation membrane comprises the third chamber.

6. The hot gas cleanup system of claim 5 wherein the gas conduit extends through the regenerator.

7. The hot gas cleanup system of claim 1 wherein the gas separation membrane is formed as a plurality of tubes, each having a first closed end and a second open end that is affixed to and in gas flow communication with a corresponding one of a plurality of gas conduits, the gas conduits together with an interior of the gas separation membrane tubes comprising the third chamber.

8. The hot gas cleanup system of claim 1 wherein the gas separation membrane is formed as a plurality of tubes, each having a first closed end and a second open end that is affixed to and in gas flow communication with a header, the header, the interior of the gas separation membrane and an exit gas conduit comprising the third chamber.

9. The hot gas cleanup system of claim 1 including a second discrete gas separation membrane disposed within said secondary chamber in gas flow communication with said second hot gas outlet.

* * * * *